(12) United States Patent
Jung (10) Patent No.: US 8,352,675 B2
(45) Date of Patent: Jan. 8, 2013

(54) DATA STORAGE DEVICE AND COMPUTER SYSTEM INCORPORATING SAME

(75) Inventor: Phil-Yong Jung, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 226 days.

(21) Appl. No.: 12/835,094

(22) Filed: Jul. 13, 2010

(65) Prior Publication Data

US 2011/0060867 A1    Mar. 10, 2011

(30) Foreign Application Priority Data

Sep. 8, 2009  (KR) .................. 10-2009-0084595

(51) Int. Cl.
*G06F 12/00*    (2006.01)
(52) U.S. Cl. .................. 711/103; 711/112; 711/E12.001
(58) Field of Classification Search .................. 711/115, 711/103, 112, E12.001
See application file for complete search history.

(56) References Cited

U.S. PATENT DOCUMENTS

| 2008/0198545 | A1* | 8/2008 | Ni et al. ........................ 361/684 |
| 2008/0200071 | A1* | 8/2008 | Barras .......................... 439/660 |
| 2008/0288703 | A1 | 11/2008 | Iyer |
| 2009/0061665 | A1* | 3/2009 | Chiang .......................... 439/99 |
| 2009/0094394 | A1 | 4/2009 | Wu et al. |

FOREIGN PATENT DOCUMENTS

JP    2008250485 A    10/2008
KR    100732354 B1    6/2007

* cited by examiner

*Primary Examiner* — Hashem Farrokh
*Assistant Examiner* — Larry Mackall
(74) *Attorney, Agent, or Firm* — Volentine & Whitt, PLLC (57) ABSTRACT

A data storage device is configured to operate as an internal device of a first host system or an external device of a second host system, depending on whether it is connected to the second host system. A connection detector detects connections between the data storage device and the second host system and facilitates communication between the data storage device and the second host system upon detecting such connections.

18 Claims, 7 Drawing Sheets

DATA STORAGE DEVICE AND COMPUTER SYSTEM INCORPORATING SAME

CROSS-REFERENCE TO RELATED APPLICATIONS

This application claims priority under 35 U.S.C. §119 to Korean Patent Application No. 10-2009-0084595 filed on Sep. 8, 2009, the disclosure of which is hereby incorporated by reference in its entirety.

BACKGROUND

Embodiments of the inventive concept relate generally to data storage devices, and more particularly, to solid state drives (SSDs).

Data storage devices form a major component of many modern electronic devices. For instance, data storage devices form a major component of personal computers, digital camcorders, portable multimedia players, and a variety of other devices.

In many electronic devices, hard disk drives (HDDs) are used as data storage devices to provide mass data storage. HDDs are an attractive form of mass data storage due to their relatively high integration density and operating speed, as well as their low cost.

An HDD typically comprises an electromagnetic recording unit, a mechanical driving mechanism, and a host interface, such as a parallel advanced technology attachment (PATA) or serial advanced technology attachment (SATA) interface. Due to their many mechanical components, however, HDDs tend to have high power consumption and low durability.

As an alternative to HDDs, many newer devices have begun to incorporate nonvolatile memories capable of providing mass data storage. High capacity nonvolatile memories can now be found, for instance, in mobile phones, personal media players, digital cameras, and notebook computers, to name just a few.

SSDs are one common form of high capacity nonvolatile memory. A solid state drive typically comprises one or more nonvolatile memory devices, such as flash memory devices, a controller, and a host interface, such as a PATA or SATA interface. Using a host interface similar to those used in HDDs, SSDs can be readily substituted for HDDs in many systems. Moreover, by comparison with HDDs, SSDs tend to have better stability, durability, data access speed and power consumption.

SUMMARY

Embodiments of the inventive concept provide data storage devices and related methods of operation. Certain embodiments allow the data storage devices to be selectively used as internal or external data storage devices for different host systems.

According to one embodiment of the inventive concept, a data storage device comprises a memory device configured to store data, a first signal connector connected to an internal connector of a first host system, a second signal connector connected to an external connector of a second host system, a connection detector configured to detect a connection between the second signal connector and the second host system, and a main controller configured to control operation of the memory device. The second host system is configured to access the memory device through the main controller as a consequence of the connection detector detecting a connection between the second signal connector and the second host system.

In certain embodiments, the data storage device is a solid state drive comprising a plurality of flash memory devices.

In certain embodiments, the memory device comprises a plurality of nonvolatile memory devices.

In certain embodiments, the first host system comprises a notebook computer.

In certain embodiments, the first signal connector comprises a serial advanced technology attachment (SATA) connector and the second signal connector comprises an external SATA (eSATA) connector.

In certain embodiments, the connection detector is located within the first host system and the second signal connector is exposed outside the first host system.

In certain embodiments, the connection detector comprises a connection detecting circuit configured to detect a connection between the second signal connector and a data cable connected to the second host system and to generate a connection determination signal based on the detection, and a connection controller configured to determine a connection status of the second signal connector based on the connection determination signal.

In certain embodiments, the connection detector is driven by a power supply unit of the first host system or a mercury battery.

In certain embodiments, the first host interface comprises a serial advanced technology attachment interface and the second host interface comprises an external SATA interface.

In certain embodiments, the main controller comprises a host interface selector comprising a host interface detector configured to detect operation of a first host interface connected to the first signal connector, a host interface switch configured to select one of the first host interface and a second host interface connected to the second signal connector, and a host interface controller configured to control the host interface switch.

In certain embodiments, the host interface selector is incorporated in the main controller.

According to another embodiment of the inventive concept, a computer system comprises a data storage device configured to selectively operate a plurality of host interfaces, a first computer configured to use the data storage device as an external data storage device, and a second computer using the data storage device as an internal data storage device. The data storage device operates as an external data storage device of the first computer as a consequence of the data storage device being connected to the first computer.

In certain embodiments, the data storage device has a security function for selectively providing access authority to the first computer to use the data storage device as the external data storage device.

In certain embodiments, the computer system further comprises a power controller configured to control a power source of the data storage device based on a power mode of the second computer.

In certain embodiments, the data storage device receives power from the first computer while operating as an external data storage device of the first computer.

In certain embodiments, the data storage device operates as an external data storage device of the first computer when not operating as an internal data storage device of the second computer.

In certain embodiments, the first computer is connected to the data storage device through an external serial advanced technology attachment interface, and the second computer is connected to the data storage device through a serial advanced technology attachment interface.

According to still another embodiment of the inventive concept, a method of operating a data storage device is provided. The data storage device comprises a memory device located in a first host system, a first host interface connected between the memory device and a first data connector of the first host system, and a second host interface connected between the memory device and a second data connector of the first host system. The method comprises detecting whether the second data connector is connected to a second host system, and upon detecting that the second data connector is connected to the second host system, selecting the second host interface as an interface for communication with the memory device, and operating the data storage device as an external data storage device of the second host system.

In certain embodiments, the first host interface is a serial advanced technology attachment interface and the second host interface is an external SATA interface.

In certain embodiments, the memory device comprises a plurality of flash memory devices.

BRIEF DESCRIPTION OF THE DRAWINGS

Embodiments of the inventive concept are described below with reference to the accompanying drawings. In the drawings, like reference numbers denote like features.

DETAILED DESCRIPTION OF THE EMBODIMENTS

Selected embodiments of the inventive concept are described below with reference to the accompanying drawings. These embodiments are presented as teaching examples and should not be construed to limit the scope of the inventive concept.

As used herein, the term "and/or" includes any and all combinations of one or more of the associated listed items. Also, where one part (or element, device, etc.) is referred to as being "connected/coupled" to another part (or element, device, etc.), it should be understood that the former may be "directly connected" to the latter, or "indirectly connected" to the latter through at least one intervening part (or element, device, etc.).

Terms of a singular form also encompass plural forms unless otherwise specified. Similarly, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, exemplary embodiments of the inventive concept will be described in detail with reference to the accompanying drawings.

Figure 1:
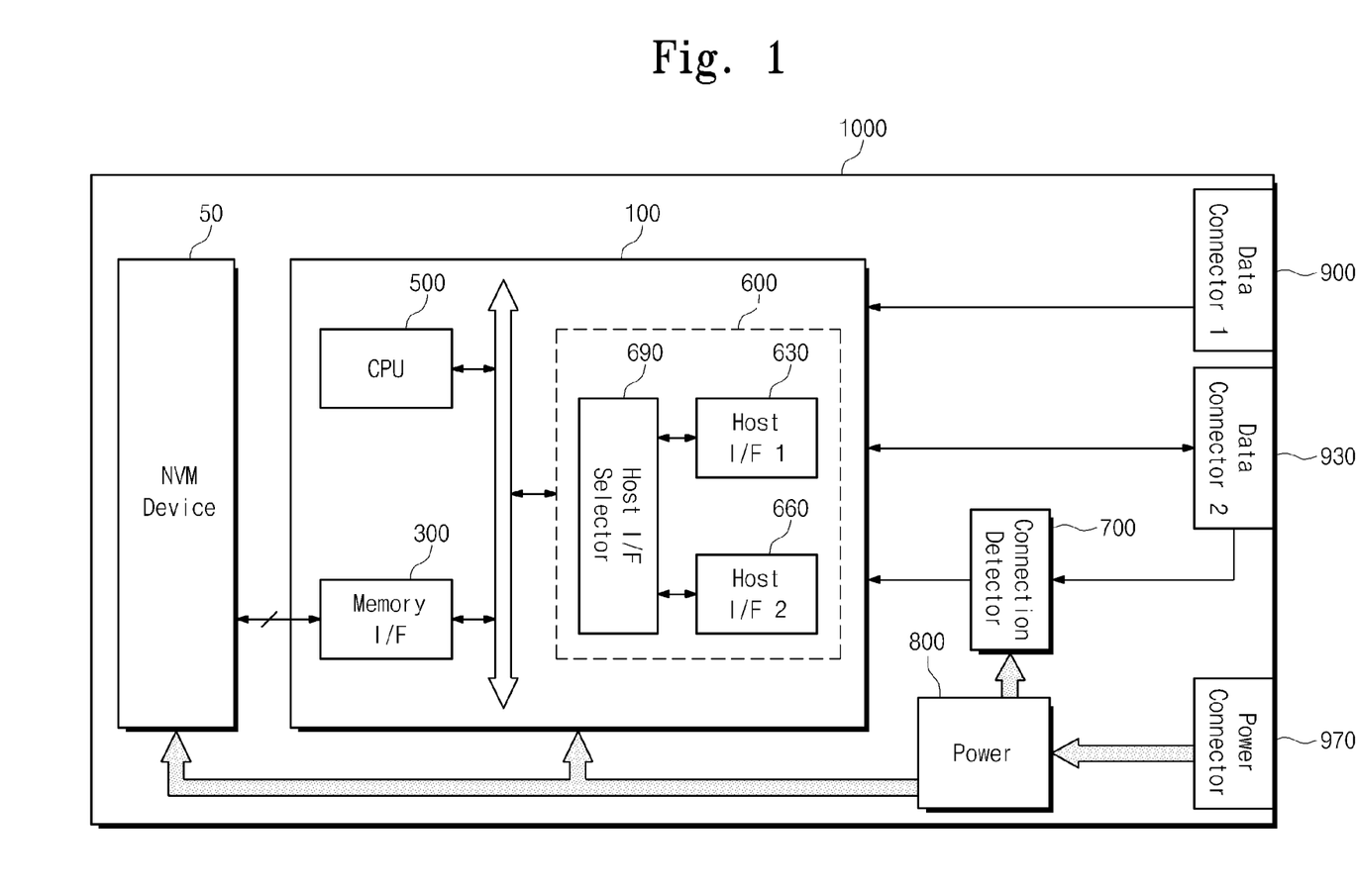
FIG. 1 is a block diagram of a data storage device according to an embodiment of the inventive concept.

FIG. 1 is a block diagram of a data storage device 1000 according to an embodiment of the inventive concept. For explanation purposes, it will be assumed that data storage device 1000 is an SSD 1000. However, the embodiment of FIG. 1 is not limited to SSDs and could comprise other types of data storage devices.

SSD 1000 of FIG. 1 typically stores a large amount of data compared with certain types of flash memory cards, such as multimedia cards (MMCs), secure digital (SD) cards, and universal serial bus (USB) memory sticks. Accordingly, SSD 1000 can be used as a substitute for an HDD to provide mass data storage.

The storage capacity of SSD 1000 can be increased by raising an amount of nonvolatile memory contained therein, such as an amount of flash memory. Moreover, SSD 1000 can have superior stability, durability, data access speed and power consumption compared with competing devices that use mechanical driving components, such as HDDs.

In the embodiment of FIG. 1, SSD 1000 comprises a nonvolatile memory (NVM) device 50, a main controller 100, a connection detector 700, a power supply unit 800, a first data connector 900, a second data connector 930, and a power connector 970.

Nonvolatile memory device 50 is connected to a memory interface (I/F) 300 of main controller 100. Data processed by main controller 100 is stored in nonvolatile memory device 50. For explanation purposes, it will be assumed that nonvolatile memory device 50 comprises a NAND flash memory device. However, embodiments of the inventive concept are not limited to using NAND flash memory devices and can be implemented with other forms of nonvolatile memory, such as NOR flash memory, phase-change random access memory (PRAM), ferroelectric random access memory (FRAM), and magnetoresistive random access memory (MRAM).

Main controller 100 is connected to a host system (not illustrated) through first and second data connectors 900 and 930. Main controller 100 comprises a memory interface 300, a central processing unit (CPU) 500, and a host interface unit 600. Although not illustrated in FIG. 1, main controller 100 can further comprise a random access memory (RAM) and an error correction unit using error correction codes (ECCs).

Memory interface 300 provides an interface for transferring commands or data between CPU 500 and nonvolatile memory device 50.

CPU 500 is connected to other components of main controller 100, such as the RAM, memory interface 300, and the error correction unit, through an internal bus of main controller 100. CPU 500 controls the overall operation of main controller 100. For example, CPU 500 typically controls read, write, and erase operations of nonvolatile memory device 50 in response to requests from the host system input to main controller 100. In certain embodiments, CPU 500 controls main controller 100 by driving firmware.

CPU 500 controls a power mode of SSD 1000. For example, where frequent data input/output requests are received from the host system, CPU 500 changes the power mode of SSD 1000 into an 'active' mode to supply necessary power to the components of SSD 1000. Alternatively, where there are no data input/output request from the host system, or where the host system is in an 'off' state, CPU 500 changes the power mode of SSD 1000 into a 'power save' mode to minimize power consumption. The power mode is not limited to the above two modes but may be set to various modes according to various operations of SSD 1000.

CPU 500 also controls a security function of SSD 1000 to prevent access by unauthorized host systems. CPU 500 typically controls the security function by performing a security algorithm upon detecting that an access attempt has been made. For example, where SSD 1000 operates as an external storage device, as will be described below, CPU 500 can request password or identification information from a host system before granting access to SSD 1000. Where CPU 500 determines on the basis of the password or identification information from the host system that the host system lacks authority to access SSD 1000, CPU 500 denies access.

Host interface unit 600 is connected to CPU 500 through the internal bus of main controller 100. Host interface unit 600 comprises a plurality of different host interfaces 630 and 660 and a host interface selector 690. Host interface unit 600 provides an interface for data exchange between the host system and main controller 100.

Connection detector 700 is connected between second data connector 930 and second host interface 660. Connection detector 700 detects a connection of a data cable to second data connector 930 of SSD 1000 from an external host system, such as a desktop computer or a notebook computer, and generates a control signal based on the detection.

Power supply unit 800 is connected to power connector 970 and the components of SSD 1000. Power supply unit 800 distributes a voltage supplied at power connector 970 to the components of SSD 1000. Power supply unit 800 transforms the voltage supplied at power connector 970 and supplies resulting voltages to respective components of SSD 1000. Power supply unit 800 can perform these transformations, for instance, by raising the supplied voltage and supplying the raised voltage to components using a voltage higher than the supplied voltage, and by dropping the supplied voltage and supplying the dropped voltage to components using a voltage lower than the supplied voltage.

In some embodiments, power is continually supplied from a power supply unit (not illustrated) of the host system to power supply unit 800 of SSD 1000. In these embodiments, where the host system is in an 'off' state, CPU 500 sets the power mode of SSD 1000 to the 'power save' mode to reduce the power consumption of the host system.

In some embodiments, power is supplied from a power supply unit (not illustrated) of the host system to power supply unit 800 in response to a control signal of connection detector 700. Connection detector 700 detects the connection of a data cable to second data connector 930 of SSD 1000 from the host system, such as a desktop computer or a notebook computer, and outputs a power supply control signal to power supply unit 800 according to a detected result. Power supply unit 800 then supplies power to the components of SSD 1000 in response to the power supply control signal of connection detector 700.

First and second data connectors 900 and 930 are connected to respective host interfaces 630 and 660. First data connector 900 is connected to first host interface 630 and is used as a connection terminal for connecting SSD 1000 and a first host system. Second data connector 930 is connected to second host interface 660 and is used as a connection terminal for connecting SSD 1000 and a second host system.

The first host system is a host system that incorporates and uses SSD 1000 as an internal data storage device, such as a desktop computer, a notebook computer, or a net book. In certain embodiments described below, the first host system comprises a notebook computer. First data connector 900 typically comprises a SATA connector.

The second host system is an external host system that is separated from the first host system and comprises a data storage device. The second host system can comprise, for instance, a desktop computer, a notebook computer, or a net book. In certain embodiments described below, the second host system is a notebook computer. Second data connector 930 typically comprises an external SATA (eSATA) connector.

The eSATA connector of second data connector 930 is exposed outside the notebook computer of the first host system. Accordingly, an eSATA cable connected to the desktop computer of the second host system can be readily connected to SSD 1000 of the notebook computer.

Power connector 970 is connected to power supply unit 800 of SSD 1000. Power connector 970 is used as a connection terminal for transferring a voltage supplied from a power supply unit of a host system to power supply unit 800.

Figure 2:
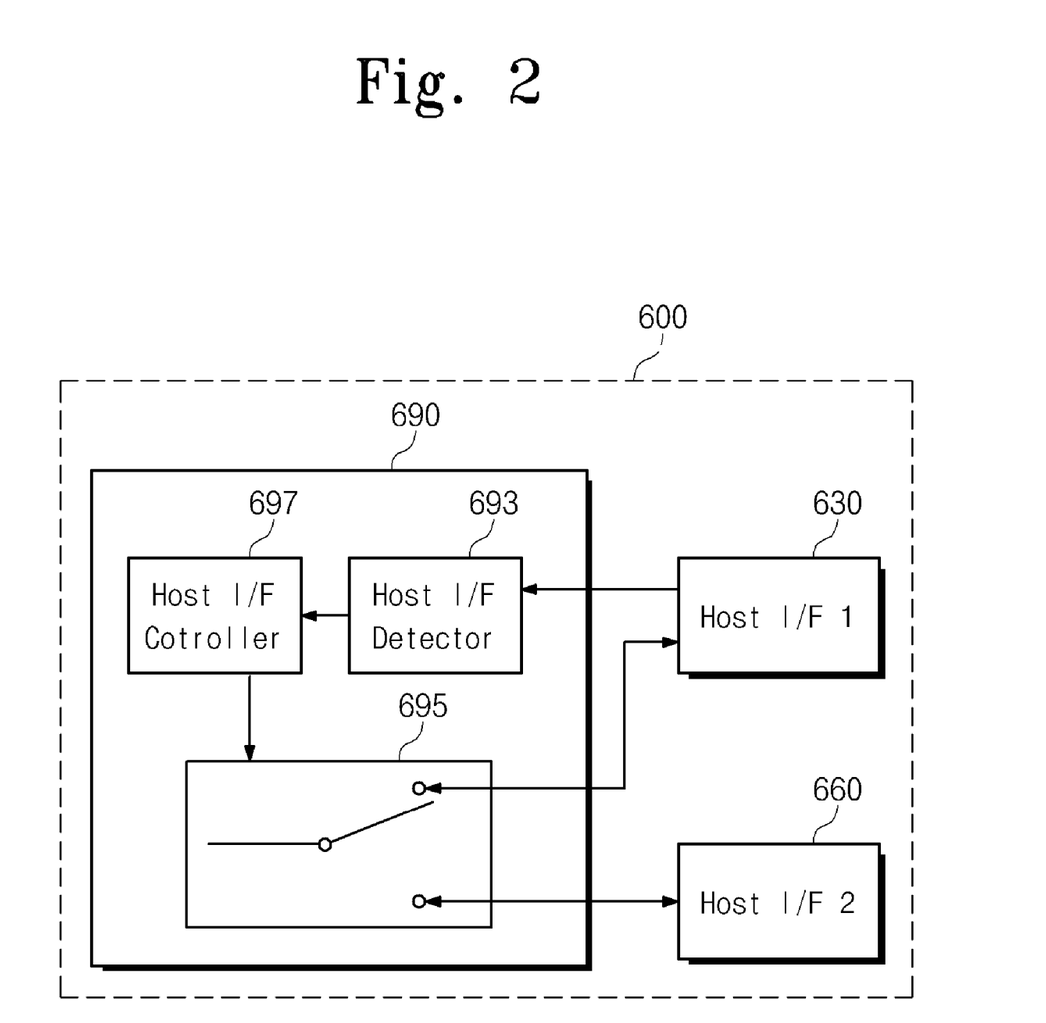
FIG. 2 is a block diagram of a host interface unit of FIG. 1 according to an embodiment of the inventive concept.

FIG. 2 is a block diagram of host interface unit 600 of FIG. 1 according to an embodiment of the inventive concept. For explanation purposes, it will be assume that host interface 600 and SSD 1000 reside in a notebook computer, and that they can be connected to an external desktop computer. In alternative embodiments, host interface 600 and SSD can be incorporated in a variety of other host systems and connected to a variety of other external systems.

Referring to FIG. 2, host interface unit 600 comprises a first host interface 630, a second host interface 660, and a host interface selector 690.

First and second host interfaces 630 and 660 are connected between host interface selector 690 and respective first and second data connectors 900 and 930. First and second host interfaces 630 and 660 are configured to receive and convert signals transmitted between a host system and SSD 1000 so that the host system and SSD 1000 can communicate with each other.

Host interface unit 600 comprises a plurality of host interfaces. The host interfaces can be configured to implement any of various interface protocols. For example, the host interfaces can be configured to implement a USB protocol, an MMC protocol, a peripheral component interconnection (PCI) protocol, a PCI-Express (PCI-E) protocol, a parallel advanced technology attachment (PATA) protocol, a serial advanced technology attachment (SATA) protocol, an external SATA (eSATA) protocol, a small computer small interface (SCSI) protocol, an enhanced small disk interface (ESDI) protocol, and an integrated drive electronics (IDE) protocol.

In the embodiment of FIG. 2, first host interface 630 comprises a SATA interface, and second host interface 660 comprises an eSATA interface. For explanation purposes, it will be assumed that the SATA interface is used as an interface between a computer and an internal data storage device of the computer, and the eSATA interface is used as an interface between a computer and an external data storage device of the computer.

Host interface selector 690 comprises a host interface detector 693, a host interface switch 695, and a host interface controller 697.

Host interface detector 693 is connected to first host interface 630 and host interface controller 697. Host interface detector 693 detects a data signal received from a notebook computer in first host interface 630, and outputs a control signal to host interface controller 697 based on the detected signal.

Host interface switch 695 is connected to first and second host interfaces 630 and 660 and host interface controller 697. Host interface switch 695 is configured to connect only one of the host interfaces to the internal bus of main controller 100 under the control of host interface controller 697.

Host interface controller 697 is connected to host interface detector 693 and host interface switch 695. Host interface controller 697 controls host interface switch 695 to enable only one of the host interfaces in SSD 1000.

Where the notebook computer changes from an off state to an on state, host interface controller 697 selects first host interface 630 so that SSD 1000 is used as an internal data storage device of the notebook computer.

Where the notebook computer is in the 'off' state, SSD 1000 operates in the 'power save' mode. While SSD 1000 operates in the 'power save' mode, if the notebook computer changes from the 'off' state to an 'on' state to attempt to communicate with SSD 1000, host interface detector 693 detects a signal transmitted between the notebook computer and first host interface 630 and outputs a corresponding control signal to host interface controller 697. Host interface controller 697 receives the control signal from host interface detector 693 and controls host interface switch 695 so that first host interface 630 operates as the host interface of SSD 1000. That is, host interface controller 697 controls SSD 1000 to be used as an internal data storage device of the notebook computer.

Where the notebook computer changes to the 'on' state, and SSD 1000 is used as an internal data storage device of the notebook computer, an eSATA cable is connected between the desktop computer and second data connector 930. Where the eSATA cable is connected to second data connector 930, connection detector 700 of FIG. 1 detects the same and outputs a corresponding control signal to host interface controller 697. In this case, host interface controller 697 maintains the operation of first host interface 630 so that SSD 1000 operates as an internal data storage device of the notebook computer. That is, host interface controller 697 controls second host interface 660 to be disabled.

Where the notebook computer is in the 'off' state, host interface controller 697 selects second host interface 660 so that SSD 1000 can be used as an external data storage device of the desktop computer.

Where the notebook computer is in the 'off' state, SSD 1000 operates in the 'power save' mode. While SSD 1000 operates in the 'power save' mode and the eSATA cable is connected to second data connector 930, connection detector 700 of FIG. 1 detects the same and outputs a corresponding control signal to host interface controller 697. Host interface controller 697 detects the operation of first host interface 630 from host interface detector 693. Where first host interface 630 is not operating, host interface controller 697 controls host interface switch 695 so that second host interface 660 operates as the host interface of SSD 1000. That is, host interface controller 697 controls SSD 1000 to be used as an external data storage device of the desktop computer.

Where the notebook computer is in the 'off' state and SSD 1000 is used as an external data storage device of the desktop computer, the notebook computer changes to the 'on' state so that SSD 1000 is used as an internal data storage device. In this case, host interface detector 693 detects the same and outputs a corresponding control signal to host interface controller 697. The notebook computer using SSD 1000 as an internal data storage device generally has a higher response priority than the desktop computer using SSD 1000 as an external data storage device. Therefore, host interface controller 697 controls host interface switch 695 so that first host interface 630 operates as the host interface of SSD 1000. In other words, host interface controller 697 controls SSD 1000 to be used as an internal data storage device of the notebook computer.

Host interface unit 600 is typically incorporated in SSD 1000. For example, in the embodiment of FIG. 1, host interface unit 600 is incorporated in main controller 100. Where host interface unit 600 is incorporated in main controller 100, main controller 100 can be mounted in various types of packages. Example types of packages for main controller 100 include package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

Figure 3:
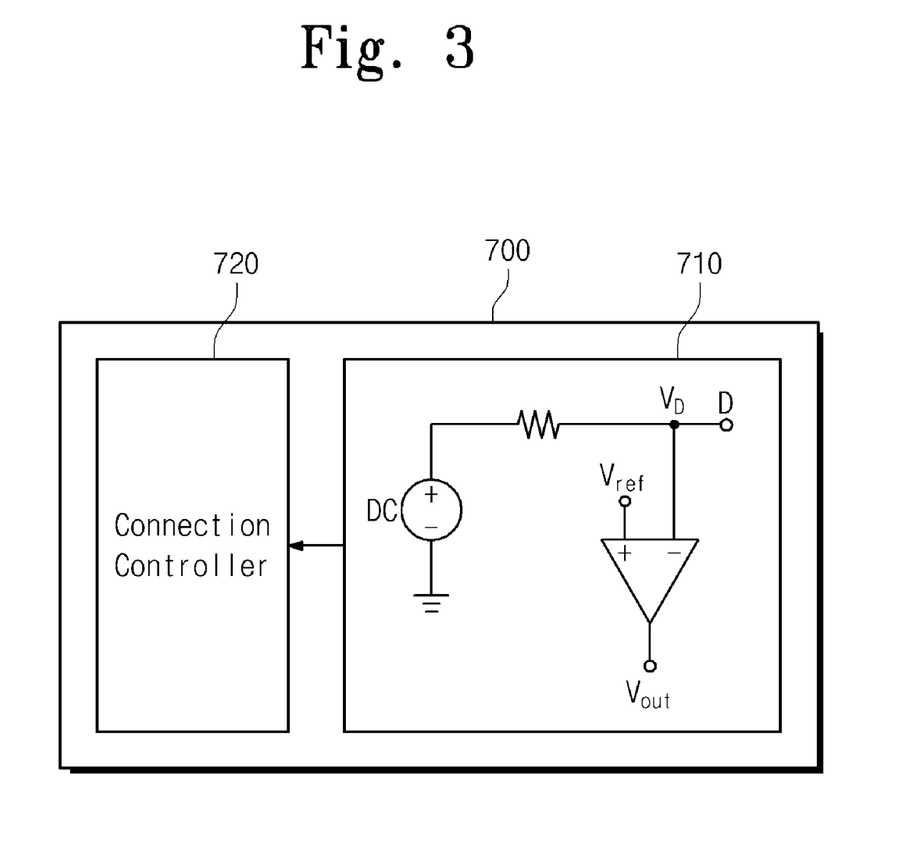
FIG. 3 is a block diagram of a connection detector of FIG. 1 according to an embodiment of the inventive concept.

FIG. 3 is a block diagram of connection detector 700 of FIG. 1 according to an embodiment of the inventive concept. In the embodiment of FIG. 3, it is assumed that SSD 1000 resides in a notebook computer and is connected to an external desktop computer. In other embodiments, SSD 1000 can reside in other types of host systems and be connected to other types of external systems.

Referring to FIG. 3, connection detector 700 comprises a connection detecting circuit 710 and a connection controller 720.

Connection detecting circuit 710 is connected to connection controller 720 and second data connector 930 of FIG. 1. Connection detecting circuit 710 detects the connection of a cable to second data connector 930 of FIG. 1. Where a ground terminal of the eSATA cable connected to the desktop computer is connected to second data connector 930 of FIG. 1 and a node "D" is shorted to ground, a voltage of $V_D$ changes and a comparator compares the same with a reference voltage $V_{ref}$ and transfers an output value $V_{out}$ to connection controller 720.

Connection controller 720 is connected to connection detecting circuit 710 and main controller 100 of FIG. 1. Connection controller 720 determines whether a cable is connected to second data connector 930 of SSD 1000 based on the signal received from connection detecting circuit 710, and outputs a control signal to main controller 100 of FIG. 1.

Where a cable is not connected to second data connector 930 of FIG. 1, connection controller 720 sets data transmitted from connection detecting circuit 710 to D1. On the other hand, where a cable is connected to second data connector 930 of FIG. 1, controller 720 sets data transmitted from connection detecting circuit 710 to D2. Where an input value of connection controller changes from D1 to D2, connection controller 720 detects the connection of the cable to second data connector 930 of FIG. 1 and outputs a corresponding control signal to main controller 100 of FIG. 1.

In some embodiments, power is continually supplied to connection detector 700 to continually detect the connection of a cable to the eSATA connector 930 from an external host system. For example, in some embodiments, power supply unit 800 of FIG. 1 continually supplies the power of a host system to connection detector 700 to continually detect the connection of a cable to second data connector 930 from an external host system. In certain alternative embodiments, SSD 1000 comprises a semi-permanent power supply unit, such as a mercury battery or a rechargeable battery, to supply power to connection detector 700 where the notebook computer is in the 'off' state.

Figure 4:
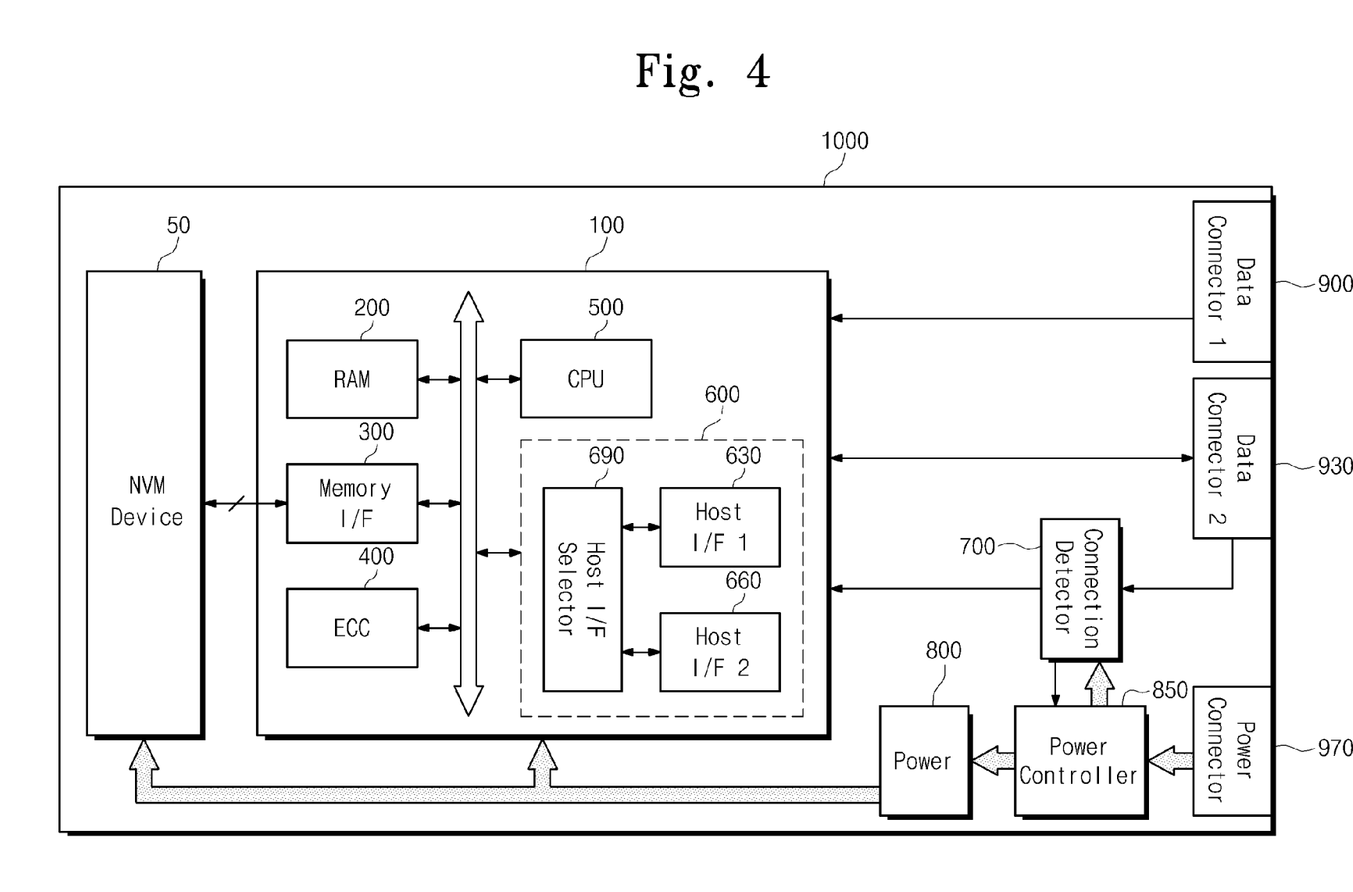
FIG. 4 is a block diagram of a data storage device according to an embodiment of the inventive concept.

FIG. 4 is a block diagram illustrating an alternative embodiment of SSD 1000. This embodiment is similar to the embodiment of FIG. 1, but further comprises a RAM 200, an error correction unit 400 using error correction codes, and a power controller 850.

Referring to FIG. 4, SSD 1000 comprises nonvolatile memory device 50, main controller 100, connection detector 700, power supply unit 800, power controller 850, first data connector 900, second data connector 930, and power connector 970. With the exception of main controller 100 and power controller 850, all of the features of SSD 1000 in FIG. 4 are substantially the same as those of SSD 1000 in FIG. 1. Accordingly, a further description of these features will be omitted for conciseness.

In FIG. 4, main controller 100 further comprises RAM 200 and error correction unit 400. RAM 200 is connected to central processing unit 500 through an internal bus of main controller 100, and is used as a working memory of CPU 500. RAM 200 typically stores system code executed by CPU 500, intermediate results generated during the execution of the system code by CPU 500, and various data used by the system code.

Error correction unit 400 is connected to CPU 500 through the internal bus of main controller 100. Although error correction unit 400 resides in main controller 100 in the embodiment of FIG. 4, error correction unit 400 can alternatively reside in other parts of SSD 1000.

Error correction unit 400 is configured to detect and correct errors in data read by CPU 500 from nonvolatile memory device 50. Where CPU 500 writes data in nonvolatile memory device 50, error correction unit 400 calculates an error correction code and stores the error correction code together with the data. Where CPU 500 reads data from nonvolatile memory device 50, error correction unit 400 compares an error correction code of the read data with an error correction code stored in the data write operation. Where the number of errors is too large to correct, error correction unit 400 may notify CPU 500.

Power controller 850 is connected between power supply unit 800 and power connector 970. Power controller 850 controls the power supply of SSD 1000 to reduce the power consumption of a host system. For example, where SSD 1000 is in the 'off' state, if the eSATA cable connected to the desktop computer is connected to second data connector 930 of SSD 1000, connection detector 700 detects the same and transmits a wake-up signal to power controller 850. Power controller 850 can then supply power to power supply unit 800 of SSD 1000 in response to the wake-up signal. Where power is supplied to power supply unit 800 of SSD 1000, SSD 1000 changes from the 'off' state to the 'on' state to start a necessary operation. In this case, the power consumption of the host system can be reduced because power controller 850 supplies power only while SSD 1000 operates.

In some embodiments, power is continually supplied to connection detector 700 to continually detect the connection of a cable to second data connector 930 from an external host system. For example, in some embodiments, power supply unit 800 of FIG. 1 continually supplies power from a host system to connection detector 700 to continually detect the connection of a cable to second data connector 930 from an external host system. In some embodiments, SSD 1000 comprises a semi-permanent power supply unit, such as a mercury battery and a rechargeable battery, to supply power to connection detector 700 where the notebook computer is in the 'off' state.

Figure 5:
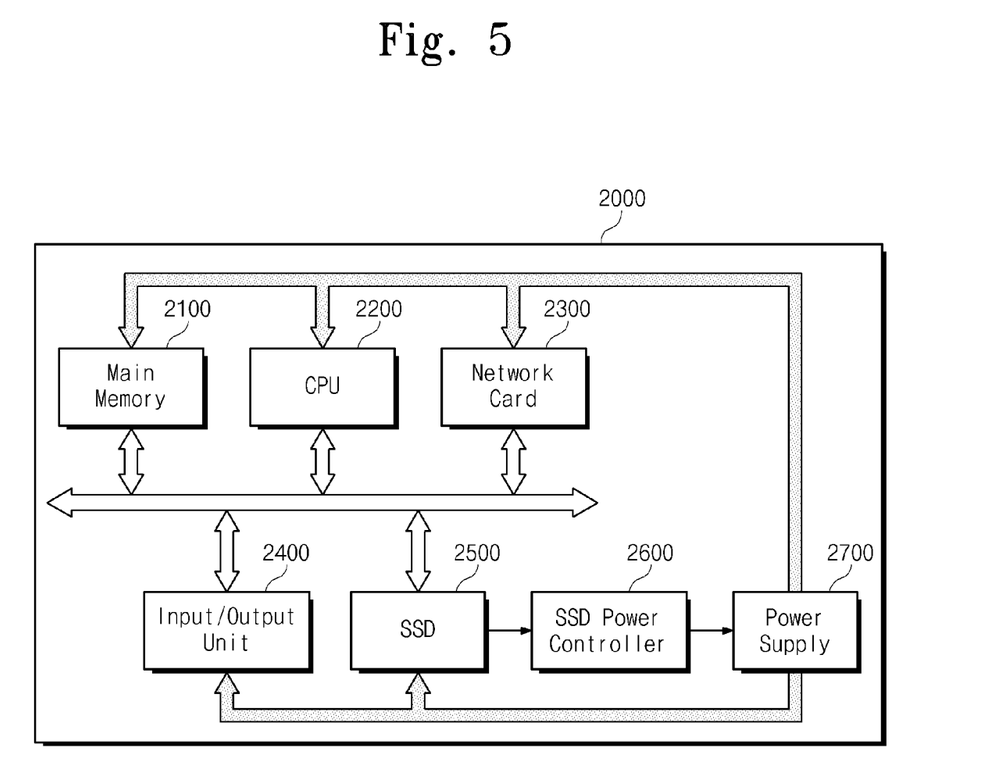
FIG. 5 is a block diagram of a host system incorporating a data storage device according to an embodiment of the inventive concept.

FIG. 5 is a block diagram of a host system 2000 comprising a data storage device according to an embodiment of the inventive concept.

Referring to FIG. 5, host system 2000 comprises a main memory 2100, a central processing unit 2200, a network card 2300, an input/output unit 2400, an SSD 2500, an SSD power controller 2600, and a power supply unit 2700. The structures and operations of main memory 2100, CPU 2200, network card 2300, input/output unit 2400 and power supply unit 2700, conform with known practices, and thus a detailed description thereof will be omitted for conciseness.

SSD 2500 of FIG. 5 has substantially the same structure and function as SSD 1000 of FIG. 1, and SSD power controller 2600 has substantially the same structure and function as power controller 850 of FIG. 4. In other words, SSD power controller 2600 of FIG. 4 can be located outside SSD 2500 so that it is provided as a component of host system 2000.

Where a eSATA cable is connected to an eSATA connector of SSD 2500, a connection detector of SSD 2500 (e.g., element 700 of FIG. 1) detects the same to transmits a wake-up signal to SSD power controller 2600. In response to the wake-up signal, SSD power controller 2600 controls power supply unit 2700 to supply power to SSD 2500.

In some embodiments, power is continually supplied to connection detector 700 of FIG. 1 to always detect the connection of a cable to second data connector 930 of FIG. 1 from an external host system. For example, in some embodiments, power from a host system is continually supplied to connection detector 700 of FIG. 1 to continually detect the connection of a cable to second data connector 930 of FIG. 1 from an external host system. In certain alternative embodiments, SSD 2500 comprises a semi-permanent power supply unit, such as a mercury battery or a rechargeable battery, to supply power to connection detector 700 of FIG. 1 where the notebook computer is in the 'off' state.

Figure 6:
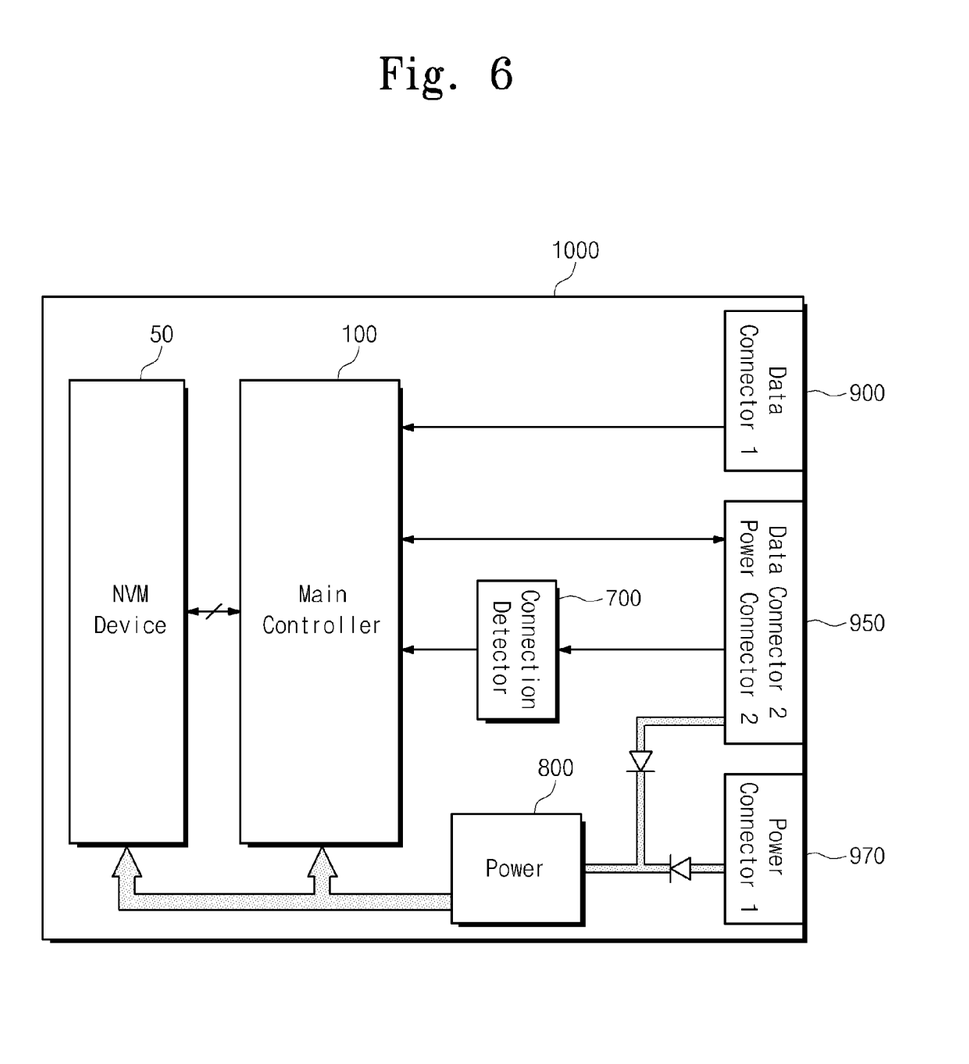
FIG. 6 is a block diagram of a data storage device according to an embodiment of the inventive concept.

FIG. 6 is a block diagram of another alternative embodiment of SSD 1000. This embodiment is similar to the embodiment of FIG. 1, except that SSD 1000 in FIG. 6 omits second data connector 930 and further comprises a second data/second power connector 950.

Referring to FIG. 6, SSD 1000 comprises main controller 100, connection detector 700, power supply unit 800, first data connector 900, second data/second power connector 950, and first power connector 970. With the exception of second data/second power connector 950, the elements of SSD 1000 of FIG. 6 are the same as those of SSD 1000 of FIG. 1, and thus a detailed description thereof will be omitted for conciseness.

Second data/second power connector 950 is connected to main controller 100 and power supply unit 800. Second data/second power connector 950 is a combination of an eSATA connector and a power connector. Herein, an eSATA connector is connected to main controller 100 to transmit data thereto, and a second power connector is connected to power supply unit 800 to supply power thereto. An example of such a connector is disclosed in U.S. Patent Application Publication No. 2009-0094394, the disclosure of which is hereby incorporated by reference. Second data/power connector 950 is capable of eSATA data transmission and power supply. Therefore, where the eSATA cable connected to the desktop computer is connected to the second data/power connector 950 of SSD 1000, SSD 1000 can be supplied with operating power. Where power is supplied to power supply unit 800, SSD 1000 may change from the 'off' state to the 'on' state to operate as an external data storage device.

Figure 7:
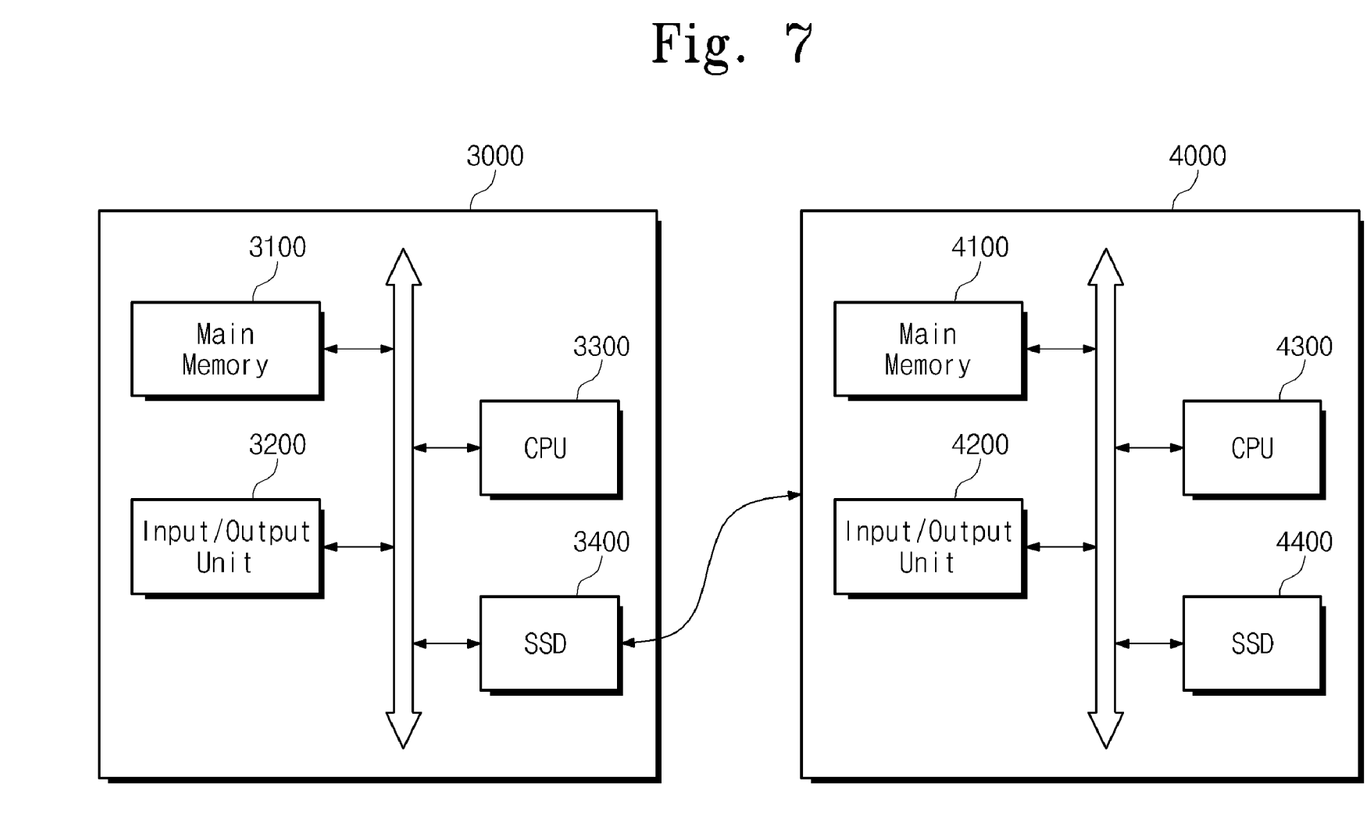
FIG. 7 is a block diagram illustrating a connection of host systems each incorporating a data storage device according to an embodiment of the inventive concept.

Power connector 970 is configured to input main power to SSD 1000. In FIG. 7, first power connector 970 and second data/power connector 950 are connected to diodes to prevent a conflict between power input through first power connector 970 and second data/power connector 950.

FIG. 7 is a block diagram illustrating a connection of host systems 3000 and 4000 each comprising a data storage device according to an embodiment of the inventive concept. In the description that follows, the combined host systems 3000 and 4000 are referred to as a host system 3000/4000.

Referring to FIG. 7, host system 3000/4000 comprises main memories 3100 and 4100, input/output units 3200 and 4200, CPUs 3300 and 4300, and SSDs 3400 and 4400. Although not illustrated in FIG. 7, host system 3000/4000 can further comprise a network card, a graphic card, and a CD-ROM drive. Main memories 3100 and 4100, input/output units 3200 and 4200, and CPUs 3300 and 4300 can be formed using known technologies, and thus a detailed description of these elements will be omitted for conciseness.

SSD 3400 of FIG. 7 has substantially the same configuration as SSD 1000 of FIG. 1. In some embodiments, first host system 3000 uses SSD 3400 as an internal data storage device. In such embodiments, where first host system 3000 is in an off state and does not use use SSD 3400, a data cable of the second host system 4000 may be connected to SSD 3400 of the first host system 3000. Under these conditions, SSD 3400 detects the connection of the data cable and operates SSD 3400 as an external data storage device of second host system 4000.

Second host system 4000 uses SSD 3400 as an external data storage device by transmitting data through a data cable between SSD 3400 and second host system 4000. In some embodiments, the data cable comprises a common data line, such as a network connection in a large area network (LAN). Such a common data line can be used to transmit data and access authority between host system 4000 and SSD 3400.

As indicated by the foregoing, in certain embodiments of the inventive concept, an eSATA interface is exposed outside of a notebook computer or other host system. The eSATA interface allows a data storage device within the host system, such as SSD 1000, to be used by devices outside the host system. The host system comprises a host interface selector for selecting whether the data storage device is used as an internal data storage device for the host system, or whether it is used by another device outside the host system.

Where the host device is a notebook computer, the data storage device can be used by other devices without requiring the netbook computer to be booted. As a result, the data storage device can be conveniently accessed by other devices.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A data storage device, comprising:
a memory device configured to store data;
a host interface unit including a first host interface and a second host interface;
a first signal connector configured to connect the first host interface to a first host system that physically incorporates the data storage device and used the data storage device as an internal data storage device;
a second signal connector configured to connect the second host interface to a second host system that is physically separate from the first host system and uses the data storage device as an external data storage device;
a connection detector disposed between the second signal connector and the second host interface and configured to detect only a connection between the second signal connector and the second host system; and
a main controller incorporating the host interface unit and configure to control access to data stored in the memory device as the data storage device operates as at least one of the internal data storage device and the external data storage device,
wherein the second host system is enabled to access the data stored in the memory device through the main controller upon a detection made by the connection detector of a connection between the second signal connector and the second host system.

2. The data storage device of claim 1, wherein the data storage device is a solid state drive comprising a plurality of flash memory devices.

3. The data storage device of claim 1, wherein the memory device comprises a plurality of nonvolatile memory devices.

4. The data storage device of claim 1, wherein the first host system comprises a notebook computer.

5. The data storage device of claim 1, wherein the first signal connector comprises a serial advanced technology attachment (SATA) connector and the second signal connector comprises an external SATA (eSATA) connector.

6. The data storage device of claim 5, wherein the first host interface comprises a serial advanced technology attachment (SATA) interface and the second host interface comprises an external SATA (eSATA) interface.

7. The data storage device of claim 1, wherein the connection detector is disposed within the first host system and the second signal connector is exposed outside the first host system.

8. The data storage device of claim 1, wherein the connection detector comprises:
a connection detecting circuit configured to detect a connection between the second signal connector and a data cable connected to the second host system and to generate a connection determination signal based on the detection; and
a connection controller configured to determine a connection status of the second signal connector based on the connection determination signal.

9. The data storage device of claim 8, wherein the connection detector is driven by a power supply unit of the first host system.

10. The data storage device of claim 1, wherein the main controller further incorporates a host interface selector comprising:
a host interface detector configured to detect operation of the first host interface;
a host interface switch configured to select one of the first host interface and the second host interface; and
a host interface controller configured to control the host interface switch.

11. The data storage device of claim 1, wherein the data storage device is a Solid State Drive (SSD).

12. A computer system, comprising:
a data storage device configured to store data received via at least one of a first host interface and a second host interface;
a first computer configured to use the data storage device as an external data storage device when connected to the first computer via an external cable; and
a second computer configured to physically incorporate and use the data storage device as an internal data storage device, wherein the data storage device comprises:
- a nonvolatile memory device;
- a first signal connector configured to connect the first host interface to the first computer that is physically separate from the second computer;
- a connection detector disposed between the first signal connector and the first host interface and configured to detect only a connection between the first signal connector and the first computer; and
- a main controller configured to control access to data stored in the nonvolatile memory device as the data storage device operates as at least one of the internal data storage device and the external data storage device, wherein the first computer is enabled to access the data stored in the nonvolatile memory device through the main controller upon a detection made by the connection detector of a connection between the first signal connector and the first computer.

13. The computer system of claim 12, wherein the main controller is further configured to provide a security function for selectively providing access authority to the first computer to access the data stored in the nonvolatile memory device.

14. The computer system of claim 12, further comprising:
- a power controller configured to control a power source of the data storage device based on a power mode of the second computer.

15. The computer system of claim 12, wherein the data storage device receives power from the first computer while operating as an external data storage device of the first computer.

16. The computer system of claim 12, wherein the data storage device operates as an external data storage device of the first computer when not operating as an internal data storage device of the second computer.

17. The computer system of claim 12, wherein the first computer is connected to the data storage device through an external serial advanced technology attachment (eSATA) interface, and the second computer is connected to the data storage device through a serial advanced technology attachment (SATA) interface.

18. The data storage device of claim 12, wherein the data storage device is a Solid State Drive (SSD).

* * * * *